United States Patent Office 3,847,993
Patented Nov. 12, 1974

3,847,993
ALLYLIC OXIDATION OF BICYCLIC HYDROCARBONS TO ALCOHOLS AND KETONES
John B. Hall, Rumson, and Lekhu Kewalram Lala, Edison, N.J., assignors to International Flavors & Fragrances Inc., New York, N.Y.
No Drawing. Filed June 21, 1971, Ser. No. 155,327
Int. Cl. C07c 45/02
U.S. Cl. 260—586 P          8 Claims

ABSTRACT OF THE DISCLOSURE

A process for allylic oxidation which comprises reacting a bicyclic compound, having a bridge carbon-to-carbon double bond, with oxygen in the presence of an organometallic catalyst containing a metal with an atomic number of from 24 to 30 to produce an oxidized product having a carbonyl or carbinol group on a carbon atom alpha to the double bond, and recovering the oxidized product

BACKGROUND OF THE INVENTION

The present invention relates to processes for producing α,β-unsaturated ketones and alcohols from bicyclic compounds.

The oxidation of organic compounds can be carried out by routes well-known in the art, but in many instances it is difficult to produce specific desirable compounds because they cannot be oxidized directly, and the process for producing them accordingly becomes quite complicated and/or provides the desired compounds only in low yield. The use of cobalt acetate bromide and oxygen for the production of ketones is shown by Hay et al. in the Canadian Journal of Chemistry, 43, 1306 (1965). In this process, tetralin is oxidized to the corresponding ketone, that is, α-tetralone. U.S. Pat. 3,042,722 shows the production of cyclohexenone by reaction of cyclohexene with oxygen in the presence of bromine and a heavy metal oxidation catalyst. The reaction shown in the 3,042,722 patent is carried out under pressure so that the material to be oxidized is in the liquid phase.

Other processes to produce cyclic oxidation products from unsaturated cyclic compounds provide epoxides rather than ketones. See Methoden der Organischen Chemie, Band VI/3, 403 (1965). Awasthy et al. have obtained similar results with chromium, as reported in the Journal of the American Chemical Society 91, 991 (1969). The production of such epoxides in oxidation reactions carried out with oxygen is undersirable for the production of certain compounds.

THE INVENTION

It has now surprisingly been found that oxidation reactions can be carried out with oxygen on tetra-substituted bridge double bonds in polycyclic compounds to provide a carbonyl or carbinol group in the alpha, or allylic, position. Thus, according to the present invention a bicyclic compound having the structure:

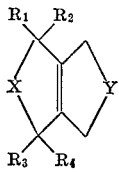

wherein $R_1$, $R_2$, $R_3$ and $R_4$ are lower alkyl, X is —$CHR_5$— or —$CHR_5$—$CHR_6$—, Y is —$CHR_7$— or —$CHR_7$—$CHR_8$—, and $R_5$, $R_6$, $R_7$, and $R_8$ are hydrogen or lower alkyl, is reacted with oxygen in the presence of a metallic catalyst to provide a carbonyl or carbinol group on the ring containing the Y substitutent in a position alpha to the bridge double bond and the alcohol or ketone so produced is recovered. The product so obtained is accordingly an unsaturated material having the formula:

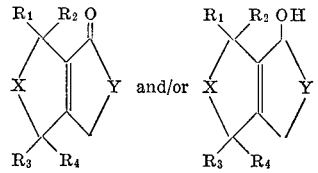

where $R_1$ through $R_4$, X, and Y have the meaning given above. The metallic catalysts utilized herein are those prepared from metals having an atomic number of from 24 to 30 inclusive, and are desirably metal-organic.

The starting materials utilized according to the present invention are bicyclic hydrocarbons having a bridge carbon-to-carbon double bond (or pi-bond) and containing either five or six carbon atoms in each of the two fused rings. Thus, the present invention is particularly useful for producing the ketones and alcohols or tetraalkyl-or higher polyalkyl-substituted compounds including 1,1,3,3-tetraalkyl- and higher polyalkyl-substituted 1,2,3,4,5,6-hexahydropentalenes, 4,4,7,7-tetraalkyl- and 1,1,3,3-tetraalkyl- and higher polyalkyl-substituted 4,5,6,7-tetrahydroindanes, and 1,1,4,4-tetraalkyl and higher polyalkyl-substituted 1,2,3,4,5,6,7,8-octahydronaphthalenes.

The alkyl groups contemplated herein are desirably lower alkyl, and alkyl groups having from one to three carbon atoms are preferred. It will be appreciated from the present disclosure that the alkyl groups represented by $R_1$ through $R_8$ can be the same or different, and in certain preferred embodiments the alkyl groups respesented by $R_1$ through $R_4$ are the same and are methyl. The substituents represented by $R_5$ through $R_8$ can be the same or different and in certain preferred embodiments $R_5$ is hydrogen or methyl and $R_6$ through $R_8$ are hydrogen.

Molecular oxygen is used as the oxidation agent according to this invention. It will be understood that the oxygen can be in the pure form, it can be admixed with inert gases such as nitrogen, argon, helium and the like, or it can be introduced in the form of air. The term "oxygen" will be utilized herein to include such forms. The oxygen is introduced into a catalyst-containing mixture of the unsaturated hydrocarbon, and it is desirably distributed throughout the mixture by bubbling, sparging, or the like.

The oxidation catalysts used herein are metal-organic compounds containing one or more metals having an atomic number from 24 to 30. Thus, the catalyst can be a metal salt with an organic aliphatic acid such as an acetate, propionate, and the like or with a carboxylic acid such as a naphthenate and the like or in the form of coordination complexes such as metal acetonyl acetonates. Desirable catalysts are those containing nickel, cobalt, copper, and manganese. Preferred catalysts include cobalt and copper acetate and cobalt naphthenate. The catalyst can also contain a halide, preferably bromine.

The quantity of catalyst used is from 1% to 20% of the amount of hydrocarbon to be treated. It is preferred to use catalyst in the amount of from about five to about 15 percent. All parts, proportions, percentages and ratios herein are by weight unless otherwise indicated.

The process of the present invention is preferably carried out at pressures as hereinafter disclosed using moderate temperatures on the order of 50° C. to 150° C. The preferred temperatures utilized will vary somewhat depending upon the particular catalyst and compound being oxidized, the type of product desired, the recovery techniques to be used, and like factors, but the preferred temperature range is generally from about 80° C. to about 120° C. The temperature range as utilized herein is sufficiently high to provide an acceptable rate of reaction, but low enough to avoid unwanted side reactions such as further oxidation and/or polymerization which needlessly consume the starting material without providing the desired product.

At atmospheric pressure and at the temperatures utilized according to the present process, reaction times of from five to 75 hours are used, and times of ten to 50 hours are generally preferred. The reaction time depends upon the particular starting material, the temperature, the yield desired, the distribution of ketone and alcohol in the product, and the catalyst used. The reaction is generally carried out for a time sufficient to effect 25–30% conversion of hydrocarbons to the desired products.

The reaction can be carried out over a range of pressures from sub-atmospheric to super-atmospheric. Thus, pressures of from about one to about 2000 pounds per square inch absolute (p.s.i.a.) can be utilized. At lower pressures the reaction can also be carried out in the vapor phase. When air is used as the oxidizing agent, it is generally preferred to conduct the process at super-atmospheric pressures of from 1000 to 2000 p.s.i.a.

After the reaction period is completed, a material such as aqueous ferrous sulfate or sodium sulfite solution is added to decompose any peroxides and hydroperoxides which may be present. The product can then be further purified and isolated by solvent extraction, washing, and drying. The allylic alcohol generally is obtained as a precipitate during the work up. The solid and liquid products can then be further purified by conventional methods such as distillation, extraction, crystallization, preparative chromatographic techniques and the like.

The cyclic ketones and alcohols produced according to the present invention have a wide range of uses. Thus, certain of the ketones have amber, woody, or other fragrances which suit them for use in perfumery. The ketone produced in Example I below, namely 6,7-dihydro-1,1,2,3,3-pentamethyl-4(5H)-indanone, has a sweet musk, precious wood odor with other properties which particularly suit it for fragrance utility.

The following examples are given to illustrate embodiments of the invention as it is presently preferred to practice it. It will be understood that these examples are illustrative, and the invention is not to be considered as restricted thereto except as indicated in the appended claims.

EXAMPLE I

A 22-liter round bottom flask equipped with stirrer, thermometer, condenser and gas addition tube is charged with 3015 g. of 4,5,6,7-tetrahydro-1,1,2,3,3-pentamethylindane and 150 g. of cobalt naphthenate. Oxygen is passed through the gas addition tube while the reaction mass is heated to a temperature in the range of 90–100° C. and maintained at that temperature for a period of 35 hours.

The reaction mass is then cooled to 25° C., and 2.25 liters of 95% ethanol is added, followed by stirring for 10 minutes. The reaction mass is stirred for one hour at 25° C., during which period 2340 cc. of 23% aqueous ferrous sulfate is added dropwise. Immediately thereafter, 7.5 liters of an aqueous solution of 10% sodium sulfate and 1% sodium hydroxide is added, and two liters of toluene is added.

The resulting mixture is stirred for 15 minutes and acidified with concentrated hydrochloric acid. The oil layer is separated, and the aqueous layer extracted with two liters of toluene. The oil layers are then combined and washed with one 5-liter portion of water. The washed oil layer is then additionally washed twice with 5-liter portions of 5% aqueous sodium hydroxide. Solvent is then stripped from the oil layer, thereby causing a precipitate to form. The precipitate is filtered off and the resulting clear oil is distilled at 95–109° C. and 2.4–2.5 mm. Hg pressure. The solid material (m.p. 108–110° C.) is crystallized from hexane (yield: 183 g.); and, as confirmed by GLC (gas liquid chromatographic) trapping and NMR (nuclear magnetic resonance), IR (infrared), and mass spectral analysis, is a material, having the structure:

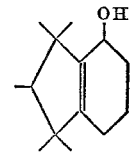

The distillate (yield 658 g.) is a ketone having the structure:

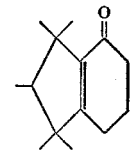

The weight of recovered hydrocarbon reactant is 1357 g.

EXAMPLE II

A 5-liter Morton flask equipped with stirrer, thermometer, condenser and gas inlet tube is charged with 1854 g. of 4,5,6,7-tetrahydro-1,1,2,3,3-pentamethylindane and 90 g. of cobalt naphthenate. The resulting mixture is heated to 100° C. and air is bubbled into the solution for 50 hours with stirring. The reaction mass is cooled at 25° C., and 1350 cc. of ethyl alcohol is added. The reaction mass is stirred for 10 minutes whereupon 1400 cc. of a 23% ferrous sulfate aqueous solution is added dropwise at 25° C. over a period of 35 minutes. The resulting mass is then stirred for an hour, and 4.5 liters of an aqueous solution containing 1% sodium hydroxide and 10% sodium sulfate is thereafter added. The resulting mixture is stirred for one hour, and then acidified with concentrated hydrochloric acid, and two liters of toluene is added.

The resulting two-phase liquid system is separated and the aqueous phase is extracted with a one-liter portion of toluene. The organic layers are combined and washed with five liters of water followed by five liters of 5% sodium hydroxide and another five liters of water.

The crude reaction product is stripped of solvent, and a precipitate is formed and filtered. The clear oil (1455 g.) is distilled. The solid is recrystallized from hexane to yield 180 g. of a compound having structure:

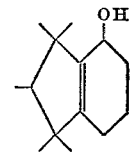

Distillation of the clear oil at 110°–117° C. and 2.7 mm. Hg provides 265 g. of a chemical compound having the structure:

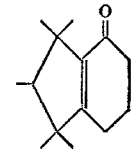

The weight of recovered hydrocarbon reactant is 684 g.

EXAMPLE III

A 100 cc. round bottom flask equipped with stirrer, thermometer, condenser, and gas addition tube is charged with 30 g. of 4,5,6,7-tetrahydro-1,1,2,3,3-pentamethylindane and 3 g. of cobalt acetate. The ingredients are heated to 100° C., and oxygen is bubbled into the reaction mass with stirring over a period of 16 hours. The mixture is then cooled to 25° C., and 23 cc. of 95% aqueous ethanol is added to the mixture which is then stirred for a period of five minutes. Twenty-three cubic centimeters of 23% aqueous ferrous sulfate is added at 25° C.; the resulting mixture is stirred for one hour at 25° C.; and 75 cc. of an aqueous solution of 1% soldium hydroxide and 18% sodium sulfate is added. The resulting mixture is stirred for 15 minutes and acidified with concentrated hydrochloric acid to provide a two-phase mixture, the phases of which are then separated.

The aqueous layer is extracted with two 50 cc. portions of toluene, and the organic layers are then combined and washed with one 50 cc. portion of water, one 50 cc. portion of 5% sodium hydroxide, and another 50 cc. portion of water. The solvent is stripped off to yield 24 g. of product containing two compounds having the structures:

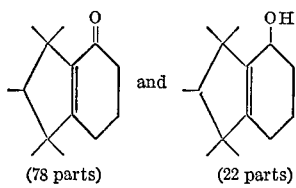

(78 parts)   (22 parts)

When the same process is carried out with 1,2,3,4,5,6,7,8-octahydro-1,1,4,4-tetramethyl naphthalene, the resulting product is a mixture containing compounds having the following structures:

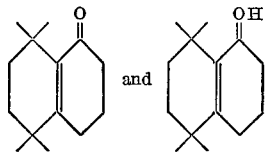

EXAMPLE IV

A 100 cc. round bottom flask equipped with stirrer, thermometer, condenser and gas addition tube is charged with 30 g. of 4,5,6,7-tetrahydro-1,1,2,3,3-pentamethylindane and 3 g. of cupric acetate. The ingredients are heated to 100° C. with stirring and oxygen is bubbled into the reaction mass over a period of six hours. The mixture is then cooled to 25° C., 23 cc. of 95% aqueous ethanol is added, and the mixture is stirred for five minutes. Then 24 cc. of 23% aqueous ferrous sulfate is added to 25° C., the resulting mixture is stirred for one hour at 25° C., 75 cc. of an aqueous solution of 1% sodium hydroxide and 18% sodium sulfate is added.

The resulting mixture is stirred for 15 minutes and then acidified with concentrated acid to yield a two-phase mixture, the phases of which are then separated. The aqueous layer is extracted with two 50 cc. portions of toluene and the organic layers are combined and washed with one 50 cc. portion of water, one 50 cc. portion of 5% aqueous sodium hydroxide, and then another 50 cc. portion of water. The solvent is then stripped off to yield 20 g. of product containing compounds having the structures:

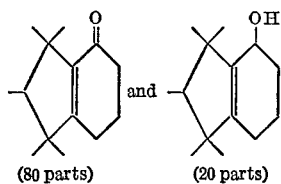

(80 parts)   (20 parts)

EXAMPLE V

A one-gallon autoclave is charged with 1000 g. of 4,5,6,7-tetrahydro1,1,2,3,3-pentamethylidane and 50 g. of cobalt naphthenate. Air is bubbled into the autoclave, the mixture is heated to 100° C., and the pressure is increased to 1500 p.s.i. The reaction mass is agitated for a period of 30 hours while being maintained at 100° C. At the end of the 30-hour period the mixture is cooled at 25° C. to provide a mixture containing unreacted hydrocarbon and chemical compounds having the structure:

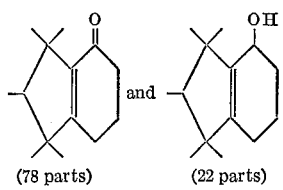

(78 parts)   (22 parts)

GLC analysis indicates a 30% conversion of hydrocarbon to ketone.

What is claimed is:

1. A process for allylic oxidation which comprises reacting a bicyclic compound having the formula:

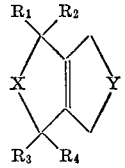

wherein $R_1$, $R_2$, $R_3$, and $R_4$ are lower alkyl of one to three carbon atoms, X is —$CHR_5$— or —$CHR_5$—$CHR_6$—, Y is —$CHR_7$— or —$CHR_7$—$CHR_8$—, and $R_5$, $R_6$, $R_7$ and $R_8$ are hydrogen or lower alkyl of one to three carbon atoms, with oxygen in the presence of a metal organic catalyst which is an acetate, propionate, naphthenate or acetonyl acetonate of nickel, cobalt, copper or manganese at a temperature from 50° to 150° C. to provide a product, said product composed of a mixture of compounds having a carbonyl or carbinol group adjacent to the double bond on the Y-containing ring, and recovering the compounds.

2. A process according to Claim 1 wherein the catalyst is an acetate or naphthenate.

3. A process according to Claim 1 wherein air is the source of oxygen.

4. A process according to Claim 3 wherein the pressure is from about 1000 to about 2000 p.s.i.a.

5. A process according to Claim 1 wherein the pressure is substantially atmospheric.

6. A process according to Claim 1 wherein the catalyst is cobalt acetate, copper acetate, or cobalt naphthenate.

7. A process according to Claim 1 wherein the bicyclic compound is 4,5,6,7 - tetrahydro - 1,1,2,3,3 - pentamethylindane.

8. A process as defined in Claim 1 wherein said metal catalyst is a metal acetonyl acetonate.

References Cited

UNITED STATES PATENTS

| | | | |
|---|---|---|---|
| 3,681,464 | 8/1972 | Theimer | 260—586 B |
| 2,223,500 | 12/1940 | Scott et al. | 260—586 |
| 3,042,722 | 7/1962 | Jason et al. | 260—586 |
| 3,404,185 | 10/1968 | Thomas et al. | 260—586 |

JOSEPH E. EVANS, Primary Examiner

D. B. SPRINGER, Assistant Examiner

U.S. Cl. X.R.

252—522; 260—617 F, 666 PY

UNITED STATES PATENT OFFICE
CERTIFICATE OF CORRECTION

Patent No. 3,847,993          Dated 11-12-74

Inventor(s) JOHN B. HALL and LEKHU KEWALRAM LALA

It is certified that error appears in the above-identified patent and that said Letters Patent are hereby corrected as shown below:

Col. 1, line 38, correct the spelling of "cyclohexenone"

Col. 5, lines 30 to 37, correct the second formula to read

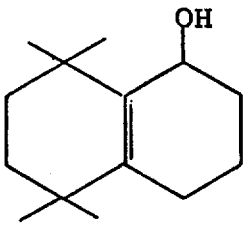

Col. 5, line 49, correct the spelling of "ferrous".

Col. 6, line 3, place a dash (-) between "tetrahydro" and "1".

Signed and sealed this 8th day of April 1975.

(SEAL)
Attest:

RUTH C. MASON
Attesting Officer

C. MARSHALL DANN
Commissioner of Patents
and Trademarks